US006460741B1

United States Patent
Ho

(10) Patent No.: US 6,460,741 B1
(45) Date of Patent: Oct. 8, 2002

(54) SPILL-RESISTANT BOTTLE FOR LIQUIDS AND THE LIKE

(76) Inventor: I-Chung Ho, 6958 Grovespring Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/429,103

(22) Filed: Oct. 28, 1999

Related U.S. Application Data

(60) Continuation-in-part of application No. 09/250,791, filed on Feb. 17, 1999, now Pat. No. 6,098,850, which is a division of application No. 08/873,070, filed on Jun. 11, 1997, now Pat. No. 5,934,017.

(51) Int. Cl.⁷ ............................................... B67D 3/00
(52) U.S. Cl. ..................... 222/482; 222/457; 222/468
(58) Field of Search ............................ 222/479, 481.5, 222/482, 457, 484, 468, 564, 185.1

(56) References Cited

U.S. PATENT DOCUMENTS

| | | | |
|---|---|---|---|
| 236,997 A | 1/1881 | Dodge | |
| 570,759 A | * 11/1896 | Law | 222/564 |
| 836,466 A | 11/1906 | Sears | |
| 1,151,997 A | * 8/1915 | Beck et al. | 222/479 |
| 2,387,699 A | * 10/1945 | Bates | 222/482 |
| 3,410,459 A | * 11/1968 | Conley | 222/479 |
| 3,902,652 A | 9/1975 | Malcolm | |
| D270,518 S | 9/1983 | Duering | |
| 4,412,633 A | * 11/1983 | Guerrazzi et al. | 222/468 |
| 4,437,587 A | 3/1984 | Duering | |
| 4,491,245 A | 1/1985 | Jamison | |
| D288,334 S | 2/1987 | Simons | |
| D288,889 S | 3/1987 | Mantani | |
| 4,935,283 A | 6/1990 | Jamison | |
| 5,067,501 A | 11/1991 | Auger | |
| 5,123,575 A | * 6/1992 | Li | 222/564 |
| 5,217,696 A | 6/1993 | Wolverton et al. | |
| 5,269,094 A | 12/1993 | Wolverton et al. | |
| D348,802 S | 7/1994 | Miller, III | |
| 5,351,438 A | 10/1994 | Wolverton et al. | |
| 5,356,053 A | 10/1994 | Di Fatta | |
| 5,433,923 A | 7/1995 | Wolverton et al. | |
| 5,579,962 A | * 12/1996 | Chen | 222/564 |
| 5,897,035 A | * 4/1999 | Schlomer | 222/479 |

* cited by examiner

Primary Examiner—Henry C. Yuen
Assistant Examiner—Dihn Q. Nguyen

(57) ABSTRACT

An improved spill-resistant liquid bottle having a curved passageway and a vent passageway on the side in a curved neck having the shape of the number "7", the letter "Z" or the letter "S" incorporated into the design of its mouth opening. This improved spill-resistant design allows a full bottle of liquid to be partially turned over with liquid level inside the bottle higher than the liquid level at the mouth opening, yet allowing no liquid to flow out from the bottle. Liquid will start to flow out only after the, bottle is turned further and the tilting angle reaches the predetermined start-to-pour angle. The start-to-pour angle is the tilting angle of the bottle when outside air starts to enter the bottle and liquid inside the bottle starts to flow out. This design makes pouring liquid from a full bottle much less likely to spill. The curved passageway creates additional flow restriction in comparison to ordinary bottles without such design. This added flow restriction results in longer filling time and more "glugging" while pouring. The separate vent passageway of this disclosure is an improvement to overcome the additional flow restriction in the curved passageway. This vent passageway provides a separate route for the release of inside air during filling process and allows ambient air to enter the bottle during pouring. Therefore, it improves the filling time and eliminates or greatly reduces the "glugging" of pouring.

32 Claims, 2 Drawing Sheets

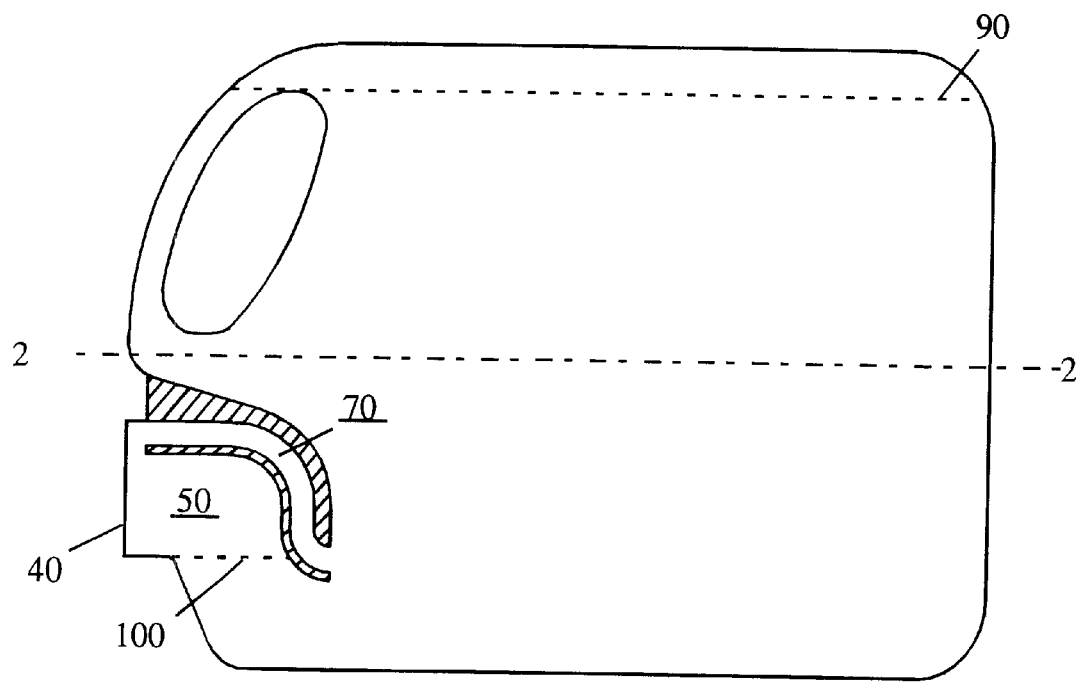
Figure 2 - A
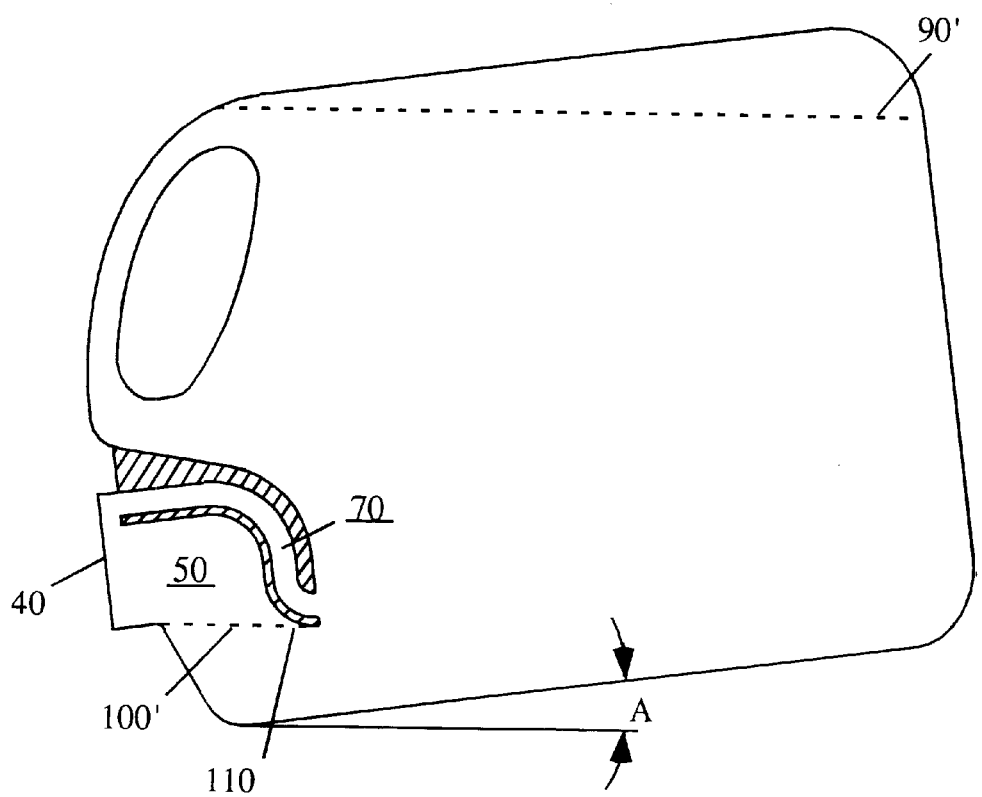
Figure 2 - B

SPILL-RESISTANT BOTTLE FOR LIQUIDS AND THE LIKE

CROSS REFERENCE TO RELATED APPLICATION

This application is a continuation-in-part of application Ser. No. 09/250,791 filed Feb. 17, 1999 now U.S. Pat. No. 6,098,850 which is a divisional of application Ser. No. 08/873,070 filed Jun. 11, 1997 now U.S. Pat. No. 5,934,017 which is incorporated herein in its entirety by this reference.

BACKGROUND OF THE INVENTION

The parent invention of the previous disclosure revealed a spill-resistant bottle design, which has a curved passageway in a curved neck communicating the bottle with the ambient. The curved neck has the basic shape of the number "7", the letter "Z" or the letter "S". The partial vacuum created inside the bottle prevents liquid from spilling when the bottle is tilted to less than the start-to-pour angle. When the tilting angle reaches the start-to-pour angle where outside air starts to enter the bottle, liquid inside the bottle will start to flow out. The curved passageway in the curved neck makes the spill-resistant bottle perform as desired. However, this very same curved passageway also adds an undesired effect to an ordinary bottle of an additional flow restriction between the bottle and the ambient. When filling a bottle, the same volume of air must be released from the bottle as the liquid is filling in. The filling of liquid and the releasing of air take place simultaneously in the curved passageway. Any added resistance will make the process more difficult and therefore slow down the filling process. By the same reason, when pouring liquid from the bottle, the same volume of air must enter the bottle to replace the liquid being poured out. A phenomenon call "glugging" appears when liquid is poured too quickly from the bottle. Glugging occurs when too much liquid tries to flow out of the bottle and not enough room is left in the curved passageway for air to enter into the bottle to replace the volume of the out-flowing liquid. When this happens, a partial vacuum is created inside the bottle that momentarily stops liquid from flowing out. Once the liquid flow stops, air starts to enter the bottle and eliminates the partial vacuum, thus resuming the liquid out flow. This intermittent and repeated liquid flowing and stopping is called "glugging" and makes the pouring unstable and undesirable.

On the market there are some bottle designs that have a hollow handle molded near the mouth opening of the bottle. A vent passageway is provided between the mouth opening and the hollow handle so that a separate air vent is provided. This allows the venting air from the mouth opening to travel down the vent passageway, through the hollow handle, and into the bottle to help eliminate or reduce the "glugging" condition.

The present invention places a vent passageway along the curved passageway of the parent invention as an improvement to the spill-resistant bottle of the parent invention. To ensure the improved spill-resistant function, the vent passageway must also have the same shape of the number "7", the letter "Z" or the letter "S". This vent passageway serves a dual purpose of venting air out of the bottle while filling and venting air into the bottle during pouring, thus removing the shortcomings of the curved neck design described above.

This invention may be applied to certain existing bottles by making the invented portion of the bottle as an adapter. The adapter will contain the above-described curved neck with the curved passageway and the vent passageway. This adapter can then be threaded to or sealingly attached to the opening of the existing bottle. The combined existing bottle and the adapter will then form the integral part of an improved spill-resistant bottle.

SUMMARY OF THE INVENTION

It is an object of the present invention to provide an improved spill-resistant bottle for liquids.

It is another object of the present invention to provide a separate vent passageway to provide air venting during filling so that the filling can be accomplished at a faster rate and during pouring to eliminate or greatly reduce the "glugging" phenomenon.

It is another object of the present invention to provide an improved spill-resistant container that can be separated into a container and a mating mouthpiece having the improved spill-resistant featured curved neck.

It is yet another object of the present invention to provide an adapter with all the improved spill-resistant features to be used to convert an ordinary container into an improved spill-resistant container.

The present invention includes an extended curved neck design of the liquid container having a curved passageway with a parallel curved vent passageway on its side. This curved passageway provides a unique feature, which allows the container to be turned side-ways after filling without spilling any liquid, even when the liquid level line inside the container is higher than the liquid level line at the mouth opening. Liquid will start to flow out from the container only when the container is turned further until a start-to-pour angle is reached. The added vent passageway provides a separate air venting during filling and pouring. The undisturbed air venting allows a faster filling time and prevents or reduces "glugging" while pouring.

BRIEF DESCRIPTION OF THE DRAWINGS

FIG. 2 shows the same view of FIG. 1 with the turning of the container after filling with liquid.

DETAILED DESCRIPTION OF THE INVENTION

Figure 1:
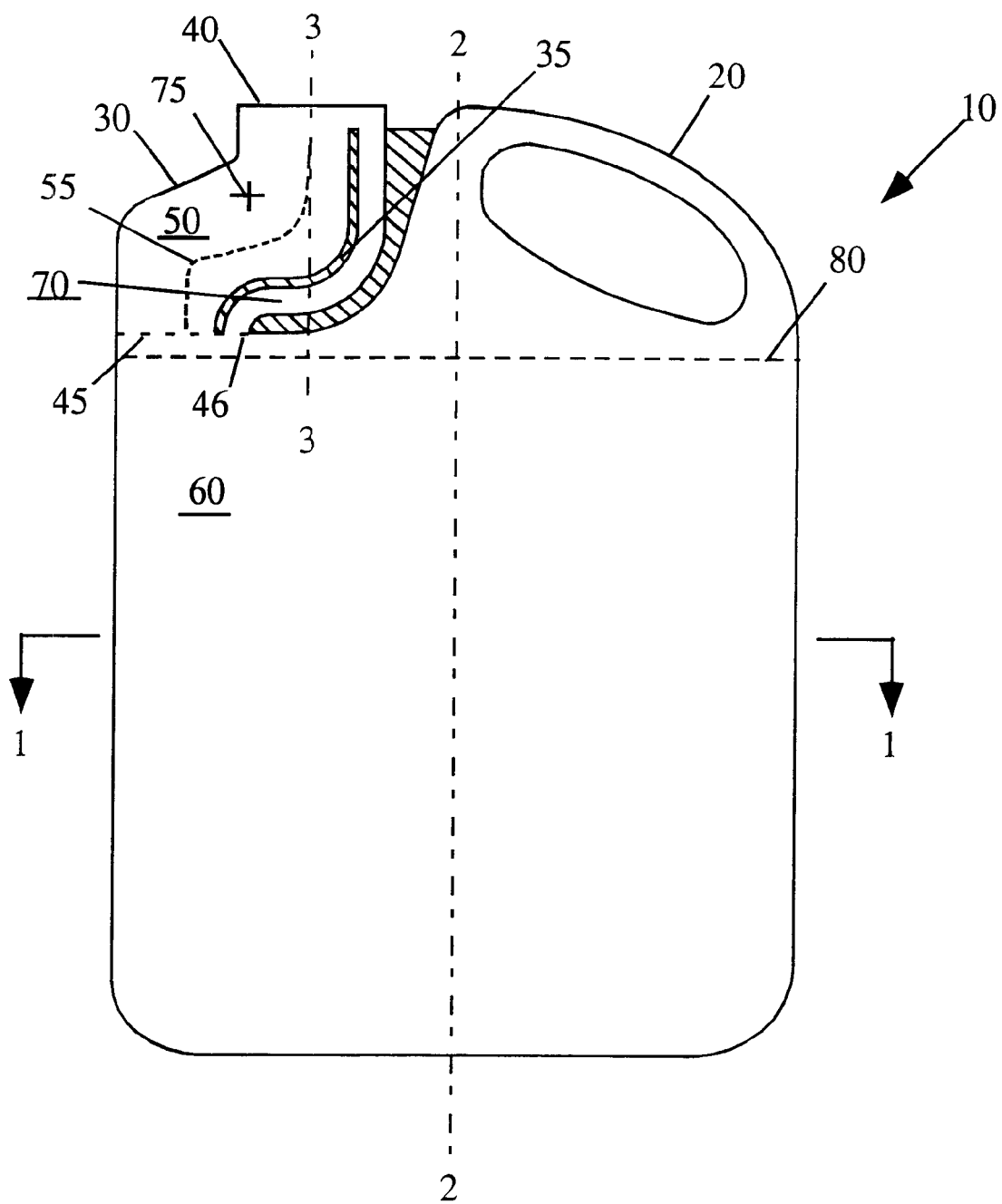
FIG. 1 is a cross-sectional view of an example of the present invention.

FIG. 1 shows the vertical cross-sectional view of the present improved spill-resistant bottle 10 invention. The horizontal cross-sectional view along line 1—1 (the sectional view is not shown), the main body of the bottle, may be circular, square, rectangular, oval or any other desired shape. The carrying handle 20 as shown is desirable for larger size bottles but not essential and can be located at different locations on the bottle. A major axis 2—2 generally defines the vertical centerline of the bottle. The bottle is in its upright position when the major axis is vertical with the upper end of the bottle on the top. The curved neck 30 provides the spill-resistant feature of the invention and is generally located at the top end region of the bottle. This curved neck 30 could be in the shape of the number "7", the letter "Z" or the letter "S". A mouth opening 40 is located at one end of the curved neck and a curved passageway 50 is defined by the centerline 55 of the curved neck. The mouth opening 40 portion of the curved neck is at the upper portion of the number "7", letter "Z", or letter "S". The curved passageway 50 and the centerline 55 each has at least one curve or bend (while shaped in the form of a number "7") but not more than two curves or bends (while shaped in the form of a letter "Z", or a letter "S"). The two-dimensional centerline 55 has a plane, which concides with the cross-sectional plane of FIG. 1. The curve or bend (or the first curve or bend if there are two curves or bends) of the centerline 55 has a pivoting axis 75 perpendicular to the plane of the centerline 55. The curve or bend (or the first curve or bend if there are two curves or bends) of the passageway 50 has an apex 35. A minor axis 3—3 perpendicular to the plane of the mouth opening 40 is generally parallel with the major axis 2—2. However, it is not necessary to be so, and the two axes could be intersected with a small angle. The curved passageway 50 connects the mouth opening 40 through the other end of the opening 45 with the inner chamber 60 of the improved spill-resistant bottle 10. A vent passageway 70 next to the curved passageway 50 having the same shape of the number "7", the letter "Z" or the letter "S" also connects from near the top of the mouth opening 40 through opening 46 to the inner chamber 60 of the improved spill-resistant bottle 10.

During the filling process of the improved spill-resistant bottle, liquid is filled from the mouth opening 40 through the curved passageway 50 into the inner chamber 60. At the same time, air inside the chamber 60 is vented through opening 46 and the vent passageway 70 to the ambient. Using a high speed filling machine, the vent passageway may be connected to a vacuum chamber where lower pressure is maintained so that air inside the improved spill-resistant bottle is drawn out at a higher rate thus allowing the filling to be accomplished at a faster rate.

When pouring liquid from the improved spill-resistant bottle, especially when liquid level in the bottle is at the full line 80, liquid will not flow out or spill from the mouth opening 40 if the improved spill-resistant bottle is turned correctly with the "7", "Z" or "S" shaped curved neck turned to the upright position where the mouth opening 40 of the curved neck 30 is on the upper portion of the number "7", or letter "Z", or letter "S" when the bottle is laid down (as shown in FIG. 2-A) where the major axis 2—2 is in the substantially horizontal position. This is due to the fact that a partial vacuum is created inside the bottle which prevents the liquid from flowing out. As shown in FIG. 2-A, when the improved spill-resistant bottle is in the laid down position, the liquid level inside the bottle chamber is shown at line 90 and the liquid level at the curved passageway is shown at line 100. When the improved spill-resistant bottle is tilted further (as shown in FIG. 2-B) and the tilting angle A is equal to or greater than the start-to-pour angle, liquid inside will flow out from the bottle. When the tilting angle A equals the start-to-pour angle, the liquid line inside the bottle becomes line 90' and the liquid line at the curved passageway becomes line 100'. The start-to-pour angle is the minimum tilting angle where air from outside will start to enter the improved spill-resistant bottle at location 110 at the end of the curved passageway 50 and the liquid level line 100' as shown in FIG. 2-B. As soon as air starts to enter the bottle, the vacuum inside the bottle is lost and liquid will start to flow. In other words, for the spill-resistance feature to work properly, the spill-resistant bottle must be turned correctly for pouring. That is, when the bottle is full, the bottle must be turned in the counter-clockwise direction for pouring. The counter-clockwise direction is defined as follows: Starting from the upright position, to pour liquid from the spill-resistant bottle, the bottle is turned about the pivoting axis 75 in the counter-clockwise direction while the plane of the centerline 55 remains vertical at all the time. This turning direction means that the bottle is turned from the other end of the opening 45 along the centerline 55 toward the mouth opening 40. It is the same turning angle where angle A (as shown in FIG. 2-B) is increasing. The vent passageway 70 next to the curved passageway 50 has the same "7", "Z" or "S" shaped curvature also preventing liquid from flowing out of the bottle when the tilting angle is less than the start-to-pour angle. When the tilting angle is much greater than the start-to-pour angle, more liquid flows out through the curved passageway 50 and leaves no room in the curved passageway for air to enter if there is no vent passageway. This will cause the interior of the bottle to have a partial vacuum and temporarily stop, liquid from flowing out. As soon as liquid stops to flow out, air will reenter the bottle and eliminate the vacuum inside and resume the liquid flow again. This intermittent and repeated liquid flowing out and air flowing in makes the flow of liquid very unstable and is commonly called "glugging". With a vent passageway 70 beside the curved passageway 50, the entire curved passageway 50 may be dedicated to the flowing of liquid and the venting of air is accomplished by the vent passageway 70, thus eliminating the very undesirable "glugging" condition.

Various modifications to the depicted and described apparatus will be apparent to those skilled in the art. Accordingly, the foregoing detailed description of the preferred embodiment should be considered exemplary in nature and not limited to the scope and spirit of the invention as set forth in the appended claims.

What is claimed is:

1. A spill-resistant container comprising:

a body including a top region and a base located opposite the top region, the base being configured to rest on a horizontal surface, the body defining an interior volume in the container for storing a liquid;

a neck connected to the top region of the body which defines and encloses a bent passageway having a first end and a second end, the bent passageway having a bent centerline;

a first opening located at the first end of the bent passageway, the first opening coupling the bent passageway to the interior volume of the container;

an unrestricted second opening located at the second end of the bent passageway, the second opening coupling the bent passageway to the exterior of the container and being sufficiently large to permit the pouring of the liquid out of the container;

a first bend defined by the bent passageway and located between the first end and second end of the bent passageway, the first bend having an apex and the distance between the base and a point of the bent centerline of the bent passageway increasing or remaining the same as the point travels from the first opening to the apex of the first bend;

wherein the bent passageway is configured to determine a start-to-pour angle between the base and the horizontal surface at which outside air starts to enter the interior volume of the container and the liquid inside the container starts to flow out of the second opening of the bent passageway, and if the container is tilted less than the start-to-pour angle, outside air can not enter the interior volume of the container and the liquid does not pour out of the second opening of the bent passageway even if the distance between the level of the liquid inside the container and the horizontal surface is greater than the distance between the apex of the first bend and the horizontal surface;

a smaller vent passageway parallel to the bent passageway located within the same curved neck and having the same form of curvature as the bent passageway, coupling the vent passageway to the interior volume of the container at one end and the exterior of the container on the other end in a parallel path as the bent passageway.

2. The spill-resistant container of claim 1 wherein the first bend is a curve having a radius.

3. The spill-resistant container of claim 1 wherein the first bend is an angled junction between two arcs, or two straight sections.

4. The spill-resistant container of claim 1 wherein the body forms a rectangularly shaped container.

5. The spill-resistant container of claim 1 wherein the body forms a spherically, elliptically, or other irregularly shaped container.

6. The spill-resistant container of claim 1 wherein the container is semi-rigid.

7. The spill-resistant container of claim 1 wherein the start-to-pour angle is between approximately 90 degrees and 180 degrees, but less than 180 degrees.

8. The spill-resistant container of claim 1 wherein the start-to-pour angle is approximately 90 degrees.

9. The spill-resistant container of claim 1 wherein as the container is tilted and the liquid starts to pour from the body, a partial vacuum is created inside the container which establishes the start-to-pour angle at which outside air begins to enter the interior volume of the container and the liquid starts to flow out of the second opening of the bent passageway.

10. The spill-resistant container of claim 1 wherein the bent passageway and the vent passageway include a second bend located between the first bend and the first opening.

11. The spill-resistant container of claim 10 wherein the bent passageway defines a bent centerline inside the bent passageway extending from the first opening through the first and second bends and to the second opening, the distance between a point of the bent centerline and the base increasing or being equal as the point travels from the first opening to the second opening.

12. The spill-resistant container of claim 1 wherein at least a portion of the neck is detachable from the container.

13. A spill-resistant container for a liquid comprising:

a body having a base and a first axis that intersects the base, the body defining an interior volume about the first axis for storing a liquid such that the container has an upright position when the base is parallel to a horizontal surface and the container has a start-to-pour position when the base is rotated to a start-to-pour angle relative to the horizontal surface;

a neck located at a first portion of the body and defining a curved passageway and a parallel curved vent passageway having a first end and a second end, the first portion being opposite of the base;

a first opening located at the first end of the curved passageway and vent passageway to couple the interior of the curved passageway and the vent passageway with the interior volume of the container;

an unrestricted second opening located at the second end of the curved passageway and the vent passageway to couple the interior of the curved passageway and the vent passageway with the exterior of the container and the second opening being sufficiently large to permit the pouring of the liquid out of the container;

a first curve located between the first end and the second end of the curved passageway and defining a two dimensional curved centerline within the curved passageway, the two dimensional curved centerline lying on a first plane which is substantially vertical with respect to the horizontal surface, the first curve having an apex and the distance between the base and a point of the curved centerline of the curved passageway increasing or remaining the same as the point travels from the first opening to the apex of the first curve;

a second axis perpendicular to the first plane which defines a pivot for rotating the first plane, wherein the first plane is defined to be rotating in a counter-clockwise direction when the first plane is rotating about the second axis such that the first opening is rotated toward the second opening along the two dimensional curved centerline while the first plane remains substantially vertical with respect to the horizontal surface;

the curved passageway being configured to determine the start-to-pour angle between the base and the horizontal surface at which outside air starts to enter the interior volume of the container and the liquid inside the container starts to flow out of the second opening of the curved passageway when the container is rotated in the counter-clockwise direction, the curved passageway being further configured such that if the base is rotated relative to the horizontal surface at an angle less than the start-to-pour angle when the container is rotated in the counter-clockwise direction, outside air can not enter the interior volume of the container and the liquid in the container does no pour out of the second opening of the curved passageway nor the vent passageway even if the level of the liquid inside the container is higher than the second opening of the curved passageway;

when the container is rotated further where larger amount of liquid pouring out from the container through the curved passageway, little or no room is left in the curved passageway for air to enter the container and the vent passageway provides the dedicated passageway for air to enter the container.

14. The spill-resistant container of claim 13 wherein the body forms a rectangularly shaped container.

15. The spill-resistant container of claim 13 wherein the body forms a spherically, elliptically, or other irregularly shaped container.

16. The spill-resistant container of claim 13 wherein the container is semi-rigid.

17. The spill-resistant container of claim 13 wherein the start-to-pour angle is between approximately 90 degrees and 180 degrees, but less than 180 degrees.

18. The spill-resistant container of claim 13 wherein the start-to-pour angle is approximately 90 degrees.

19. The spill-resistant container of claim 13 wherein as the container is rotated and the liquid starts to flow from the first opening toward the second opening, a partial vacuum is created inside the container which establishes the start-to-pour angle at which outside air starts to enter the interior volume of the container and the liquid starts to flow out of the second opening of the curved passageway.

20. The spill-resistant container of claim 13 wherein the curved passageway and the vent passageway include a second curve.

21. The spill-resistant container of claim 20 wherein the second curve is located between the first curve and the first opening.

22. The spill-resistant container of claim 13 wherein at least a portion of the neck is detachable from the container.

23. A curved neck for converting a liquid-storage container having an opening into a spill-resistant container, the container having a base configured to rest on a horizontal surface, the curved neck comprising:

a neck body defining a curved passageway and a parallel vent passageway having a first end plane, a second end plane and a first curve located between the first end plane and the second end plane, the neck being adapted to be attached to the container at a side opposite of the base, the curved passageway having a first curve and defining a curved centerline within the curved passageway, the first curve having an apex and the distance between the base and a point of the curved centerline of the curved passageway increasing or remaining the same as the point travels from the first opening to the apex of the first curve;

a first opening located at the first end plane of the curved passageway and vent passageway;

a connector located at the first end plane of the curved passageway and the vent passageway which permits the first opening of the curved passageway and the vent passageway to be sealingly connected to the opening of the container;

an unrestricted second opening located at the second end plane of the curved passageway and vent passageway and being sufficiently large to permit the pouring of the liquid out of the container;

when the curved neck is connected to the container to form a spill-resistant container, the curved passageway determines an angle wherein if the container is rotated equal to the angle, the liquid starts to pour out of the second opening of the curved passageway, if the container is rotated more than the angle, the liquid inside the container flows out of the second opening of the curved passageway, and if the container is rotated less than the angle, the liquid does not pour out of the second opening of the curved passageway even if the distance between the level of the liquid inside the container and the horizontal surface exceeds the distance between the second opening and the horizontal surface;

a smaller vent passageway parallel to the bent passageway located within the same curved neck and having the same form of curvature as the bent passageway, coupling the vent passageway to the interior volume of the container at one end and the exterior of the container on the other end in a parallel path as the bent passageway.

24. The curved neck of claim 23 wherein the connector is sealingly mateable to the opening of the container.

25. The curved neck of claim 23 wherein the connector is permanently attachable to the opening of the container.

26. The curved neck of claim 23 wherein the curved passageway and the vent passageway include two curves.

27. The curved neck of claim 23 wherein the angle is greater than approximately 90 degrees and less than 180 degrees.

28. A spill-resistant container for a liquid comprising:

a body having a base and an axis that intersects the base, the body defining an interior volume around the axis in the container for storing a liquid such that the container has an upright position when the base is parallel to a horizontal surface and the container has a start-to-pour position when the base is tilted at a start-to-pour angle from the horizontal surface;

a neck located at a first portion of the body and defining a bent passageway having a first end and a second end, the first portion being located opposite the base;

a first opening located at the first end of the bent passageway to couple the bent passageway with the interior volume of the container;

an unrestricted second opening located at the second end of the bent passageway to couple the bent passageway with the exterior of the container and the second opening being sufficiently large to permit the pouring of the liquid out of the container;

a first bend located between the first end and the second end of the bent passageway;

the bent passageway having a bent centerline inside the bent passageway extending from the first opening through the first bend to the second opening of the bent passageway, the distance between the bent centerline and the base stays the same or increasing along the bent passageway starting from the first opening through the first bend to the second opening;

the bent passageway further being configured to determine the start-to-pour angle between the base and the horizontal surface at which the liquid inside the container starts to flow out of the second opening of the bent passageway;

wherein the bent passageway is configured such that if the base is tilted from the horizontal surface at an angle less than the start-to-pour angle, the liquid does not pour out of the second opening of the bent passageway even if the level of the liquid in the container is higher than the bent centerline;

a smaller vent passageway parallel to the bent passageway located within the same curved neck and having the same form of curvature as the bent passageway, coupling the vent passageway to the interior volume of the container at one end and the exterior of the container on the other end in a parallel path as the bent passageway.

29. The spill-resistant container of claim 28 wherein the start-to-pour angle is between approximately 90 degrees and 180 degrees, but less than 180 degrees.

30. The spill-resistant container of claim 28 wherein the start-to-pour angle is approximately 90 degrees.

31. The spill-resistant container of claim 28 wherein the bent passageway and the vent passageway include a second bend.

32. The spill-resistant container of claim 28 wherein the first bend having an apex and the distance between the base and a point of the bent centerline of the bent passageway increasing or remaining the same as the point travels from the first opening to the apex of the first bend.

* * * * *